(12) United States Patent
Tamaru

(10) Patent No.: US 8,059,895 B2
(45) Date of Patent: Nov. 15, 2011

(54) IMAGE PROCESSING APPARATUS

(75) Inventor: Jun Tamaru, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 670 days.

(21) Appl. No.: 12/243,344

(22) Filed: Oct. 1, 2008

(65) Prior Publication Data

US 2009/0097750 A1  Apr. 16, 2009

(30) Foreign Application Priority Data

Oct. 16, 2007 (JP) ................................. 2007-269532

(51) Int. Cl.
*G06K 9/34* (2006.01)

(52) U.S. Cl. ..................................................... 382/176

(58) Field of Classification Search .................. 382/176, 382/100, 173, 181, 190, 195; 358/3.28, 474; 341/50; 360/18

See application file for complete search history.

(56) References Cited

U.S. PATENT DOCUMENTS

| | | | |
|---|---|---|---|
| 5,680,478 A | 10/1997 | Wang et al. | 382/176 |
| 5,680,479 A | 10/1997 | Wang et al. | 382/176 |
| 5,861,619 A | 1/1999 | Horino et al. | 235/470 |
| 6,081,616 A | 6/2000 | Vaezi et al. | 382/171 |
| 6,115,497 A | 9/2000 | Vaezi et al. | 382/174 |
| 6,359,573 B1 * | 3/2002 | Taruguchi et al. | 341/50 |
| 7,106,884 B2 | 9/2006 | Tamaru | |
| 7,190,807 B2 | 3/2007 | Tamaru et al. | |
| 7,209,572 B2 | 4/2007 | Iwamura et al. | |
| 7,260,238 B2 | 8/2007 | Iwamura et al. | |
| 7,269,274 B2 | 9/2007 | Iwamura et al. | |
| 7,729,018 B2 * | 6/2010 | Matsunoshita | 358/474 |
| 7,978,427 B2 * | 7/2011 | Kobayashi et al. | 360/18 |
| 2006/0268311 A1 | 11/2006 | Tamaru | |
| 2007/0127771 A1 | 6/2007 | Kaneda et al. | |
| 2007/0171453 A1 | 7/2007 | Tamaru | |
| 2008/0298634 A1 * | 12/2008 | Harada et al. | 382/100 |
| 2010/0103470 A1 * | 4/2010 | Harada | 358/3.28 |

FOREIGN PATENT DOCUMENTS

| | | |
|---|---|---|
| JP | 6-68301 | 3/1994 |
| JP | 9-186603 | 7/1997 |
| JP | 3728209 B2 | 12/2005 |

* cited by examiner

*Primary Examiner* — Ishrat I Sherali

(74) *Attorney, Agent, or Firm* — Fitzpatrick, Cella, Harper & Scinto

(57) ABSTRACT

An information embedding apparatus (100) which embeds information by changing the character spacing in a document image includes a discrimination unit (101) which discriminates a text area in the document image, a circumscribed rectangle extraction unit (102) which extracts the circumscribed rectangle of each character in the text area, a determination unit (103) which determines, based on the position and size of each extracted circumscribed rectangle, whether a portion having a character spacing smaller than a threshold exists, a reduction unit (104) which, for a character determined to have a character spacing smaller than the threshold, reduces the size of the character in at least the character arrangement direction, and a character position changing unit (105) which changes, in accordance with information to be embedded, the position of a character determined to have a character spacing equal to or larger than the threshold, and that of a character reduced.

11 Claims, 13 Drawing Sheets

IMAGE PROCESSING APPARATUS

BACKGROUND OF THE INVENTION

1. Field of the Invention

The present invention relates to a technique of embedding information in a document image.

2. Description of the Related Art

There is proposed a technique of embedding information in a document image by changing the spacing between words or characters (Japanese Patent Laid-Open No. 9-186603 and Japanese Patent No. 3728209). This technique represents 1-bit information using two spacings, before and after a character.

However, according to the method of embedding information by using the difference between character spacings, it is difficult to determine whether information is embedded for a proportional font, single-byte character, and the like for which the character spacing is originally narrow. In addition, information may be erroneously extracted owing to noise or distortion generated in printing or scanning.

SUMMARY OF THE INVENTION

It is an object of the present invention to embed information in a document image so as to be able to more accurately extract the embedded information.

According to one aspect of the present invention, there is provided an image processing apparatus which embeds information by changing a character spacing in a document image, the apparatus comprising:

discrimination means for discriminating a text area in the document image;

circumscribed rectangle extraction means for extracting a circumscribed rectangle of each character in the text area discriminated by the discrimination means;

determination means for determining, based on a position and size of each extracted circumscribed rectangle, whether a portion having a character spacing smaller than a threshold exists;

reduction means for, in a portion determined by the determination means to have a character spacing smaller than the threshold, reducing a size of a character in at least a character arrangement direction so as to set the character spacing to be not smaller than the threshold; and character position changing means for changing, in accordance with information to be embedded, a position of a character in a portion determined by the determination means not to have a character spacing smaller than the threshold, and a position of a character reduced by the reduction means.

As described above, the present invention can embed information in a document image so as to be able to more accurately extract the embedded information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will be described in detail below with reference to the accompanying drawings.

First Embodiment

[Overall Configuration]

Figure 8:
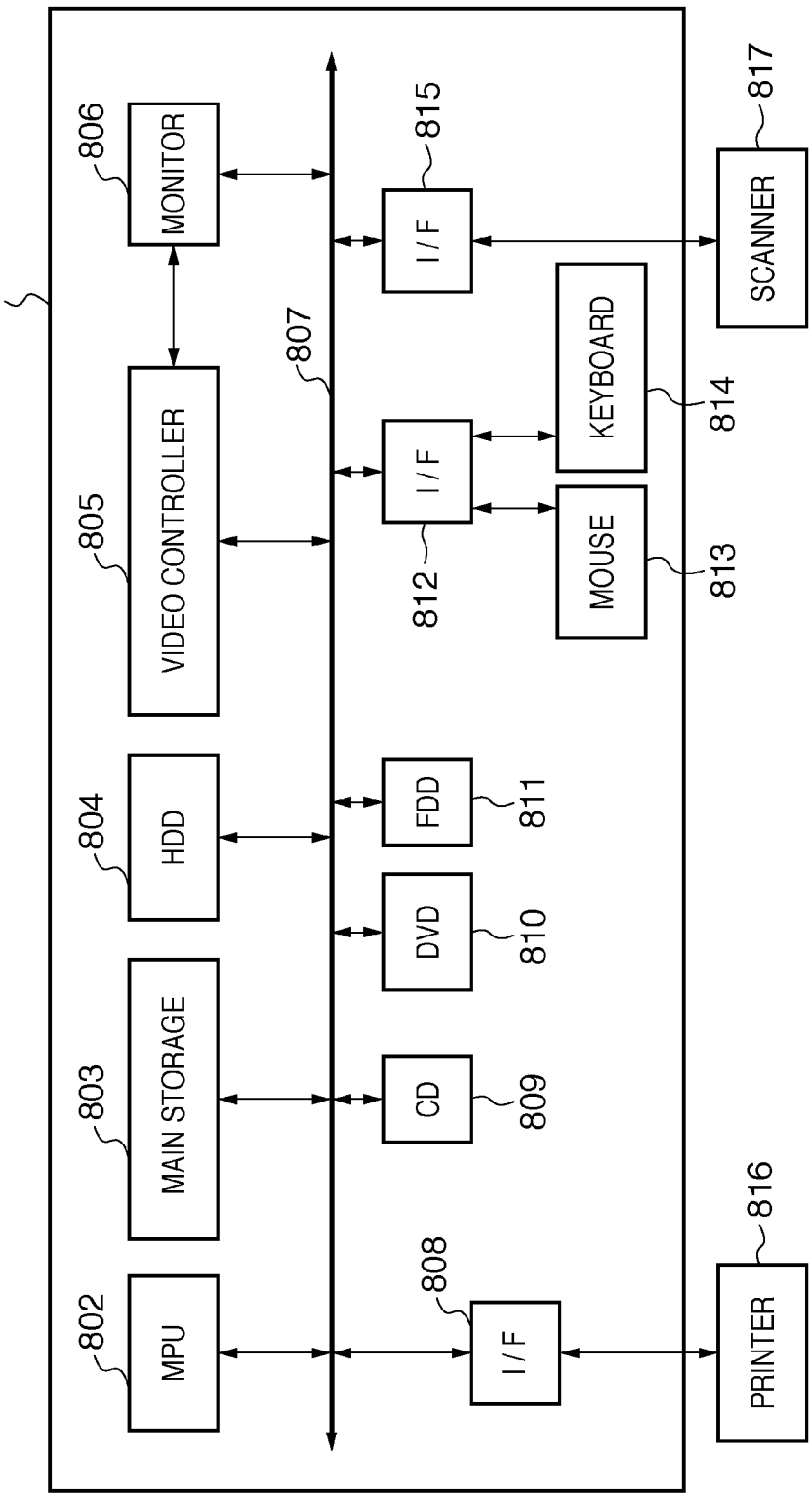
FIG. 8 is a block diagram of an image processing system 800 according to the first embodiment.

FIG. 8 is a block diagram of an image processing system 800 according to the first embodiment of the present invention. A computer 801 is a general-purpose information processing apparatus such as a popular personal computer. The computer 801 can receive an image scanned by a scanner 817 serving as an image input apparatus, and edit and save it. The computer 801 can print an image scanned by the scanner 817 from a printer 816. The user inputs various instructions and the like from an instruction input unit such as a mouse® 813 or keyboard 814. In the computer 801, blocks (to be described later) are connected by a bus 807 and can exchange various data.

An MPU 802 can control the operation of each block in the computer 801, and execute an internally stored program. A main storage 803 comprises a RAM, and temporarily stores a program and target image data for processing by the MPU 802. A hard disk (HDD) 804 stores an OS transferred to the main storage 803 or the like, and can store application programs and image data in advance and save processed image data.

A scanner interface (I/F) 815 is connected to the scanner 817 which scans a document, film, or the like to generate image data. The scanner interface 815 can input image data obtained by the scanner 817. A printer interface 808 is connected to the printer 816 which prints image data. The printer interface 808 can transmit image data to be printed to the printer 816.

A CD drive 809 can read data stored in a CD (CD-R/CD-RW) serving as a kind of external storage medium, and write data in it. Similar to the CD drive 809, an FDD drive 811 can read data from an FDD and write data in it. Similar to the FDD drive 811, a DVD drive 810 can read data from a DVD and write data in it.

When an image editing program and printer driver are stored in a CD, FDD, DVD, or the like, they are installed in the HDD 804, and if necessary, transferred to the main storage 803.

An interface (I/F) 812 is connected to the mouse 813 and keyboard 814 in order to accept input instructions from them. A monitor 806 is a display device capable of displaying the result of information embedding processing and the progress of processing. A video controller 805 transmits display data to the monitor 806.

Note that the apparatus according to the present invention may also be applied to a system including a plurality of devices (e.g., a host computer, interface device, reader, and printer), or an apparatus (e.g., a copying machine or facsimile apparatus) formed by a single device.

In the above-described configuration, the computer 801 functions as an information embedding apparatus or information extraction apparatus when the MPU 802 is used to execute a program loaded to the main storage 803 in accordance with an input instruction from the mouse 813 or keyboard 814. In this case, the monitor 806 can display the execution status or execution result.

[Arrangement of Information Embedding Apparatus 100]

Figure 1:
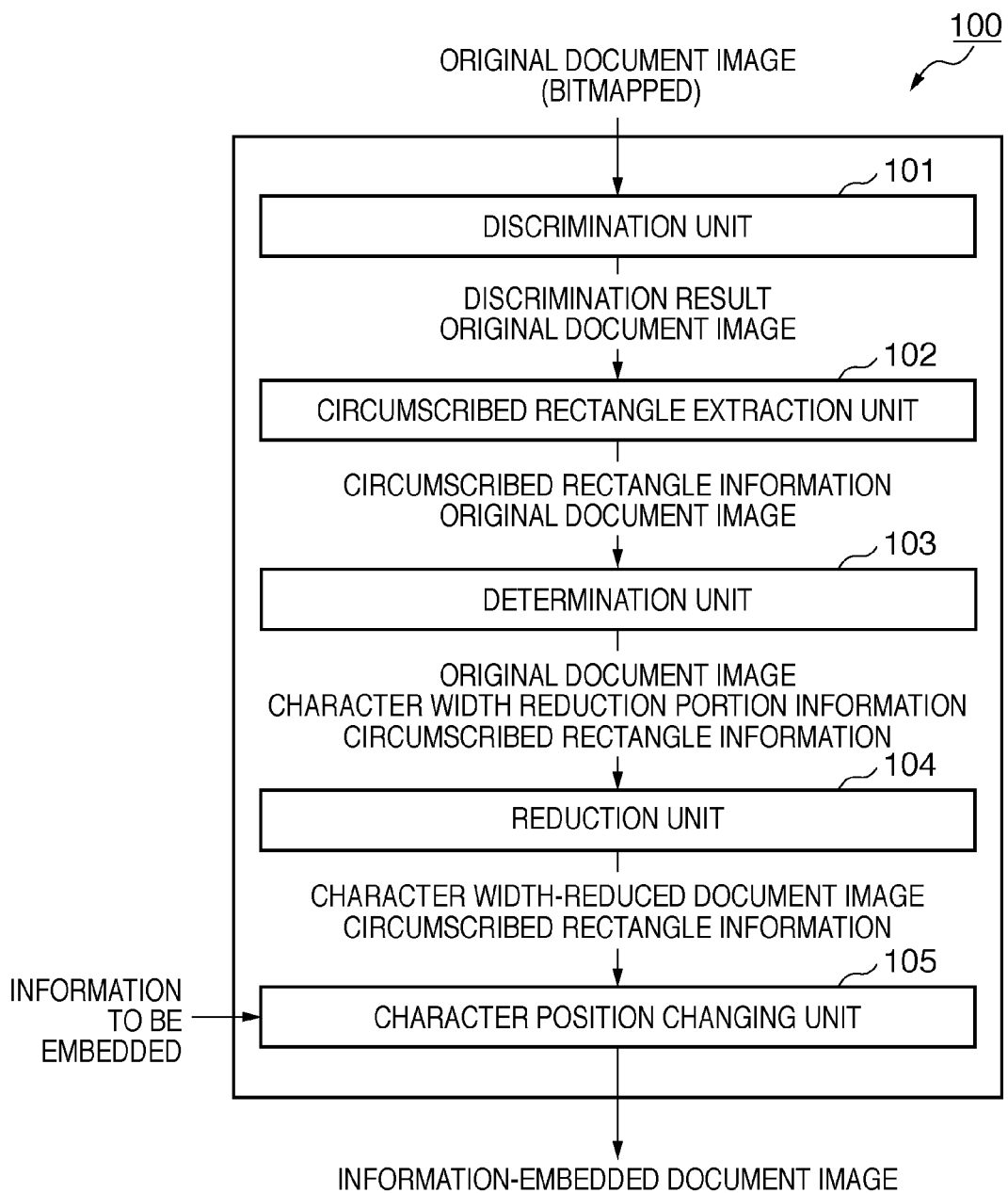
FIG. 1 is a block diagram showing the functional arrangement of an information embedding apparatus 100 according to the first embodiment.

FIG. 1 is a block diagram showing the functional arrangement of an information embedding apparatus 100 according to the first embodiment of the present invention. The information embedding apparatus 100 embeds information by changing the character spacing in a document image. The information embedding apparatus 100 comprises a discrimination unit 101, circumscribed rectangle extraction unit 102, determination unit 103, reduction unit 104, and character position changing unit 105.

The discrimination unit 101 discriminates a text area from the areas of a text, figure, photograph, and the like in a document image. In the first embodiment, the document image is bitmapped and is a binary image in which the value of each pixel represents white or black.

The circumscribed rectangle extraction unit 102 extracts the circumscribed rectangle of each character in the text area discriminated by the discrimination unit 101. This processing is to first extract a row using a horizontal projection and then extract a character using a vertical projection for each extracted row.

The discrimination unit 101 and circumscribed rectangle extraction unit 102 are based on a known document image analysis technique. The document image analysis technique is an element technique of the character recognition technique, and is disclosed in, for example, Japanese Patent Laid-Open No. 6-68301.

The determination unit 103 determines, based on the position and size of each extracted circumscribed rectangle, whether there is a portion having a character spacing smaller than a threshold. Embedding of information by changing the character position, and printing and scanning characteristics are considered from the circumscribed rectangle extraction result.

For a character determined by the determination unit 103 to have a character spacing smaller than the threshold, the reduction unit 104 reduces the size of the character in the character arrangement direction to set the character spacing equal to or larger than the threshold. When reducing a character, the reduction unit 104 distributes the shortage of the character width to characters within a predetermined range in accordance with the ratios of character spacings to the sum of the character widths of characters within the predetermined range. A character is reduced in only the character arrangement direction by using the nearest neighbor method, linear interpolation, or bicubic method, details of which will be described later.

In accordance with information to be embedded, the character position changing unit 105 changes, in the horizontal direction, the positions of characters determined by the determination unit 103 to have a character spacing equal to or larger than the threshold, and those of characters reduced by the reduction unit 104, generating an information-embedded document image.

The discrimination unit 101, circumscribed rectangle extraction unit 102, determination unit 103, reduction unit 104, and character position changing unit 105 operate under the control of programs executed by the MPU 802.

With the same arrangement as that of the information embedding apparatus 100, an information extraction apparatus for extracting information can extract embedded information.

[Image Processing]

Figure 3:
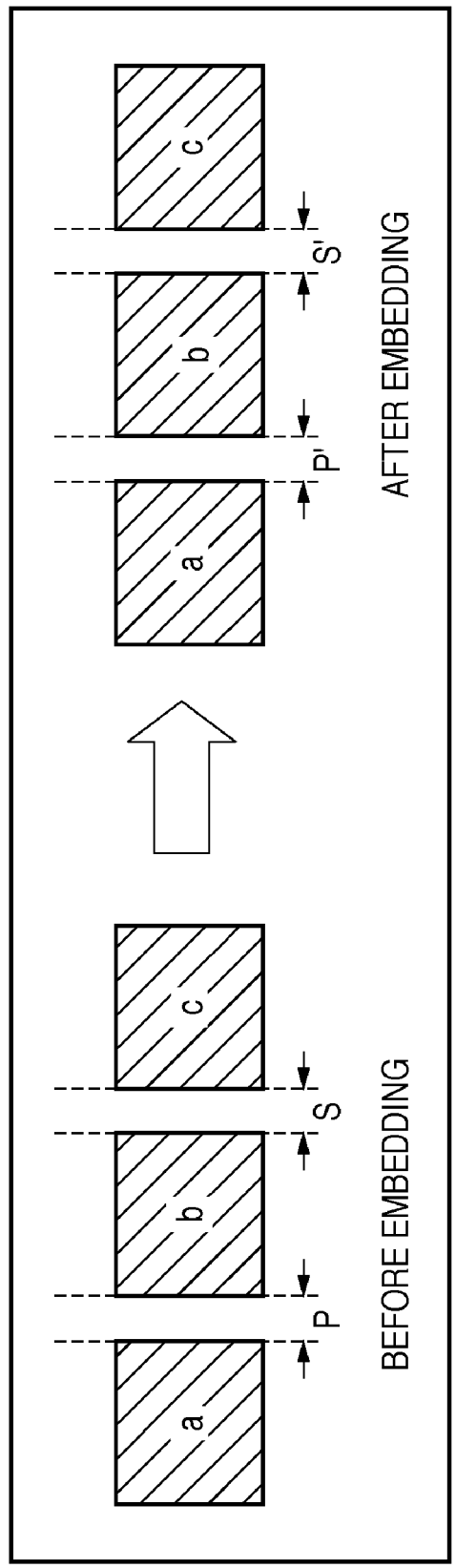
FIG. 3 is a view schematically showing an image processing procedure according to the first embodiment.

FIG. 3 is a view schematically showing an image processing procedure according to the first embodiment. When embedding information by changing the character spacing, 1-bit information can be embedded using the difference between character spacings.

For example, as shown in FIG. 3, let P and S be two character spacings before and after character "b" before embedding information, respectively. Let P' and S' be character spacings before and after character "b" after embedding information, respectively. It can be defined that 0 is embedded if P'>S', and 1 is embedded if P'<S'. P' and S' can also be given by the following equations.

When information to be embedded is 0, $P'=(P+S)(1+\rho)/2$ and $S'=(P+S)(1-\rho)/2$ where $\rho$ is a constant representing the embedding strength. When information to be embedded is 1, $P'=(P+S)(1-\rho)/2$ and $S'=(P+S)(1+\rho)/2$. The positions of characters are horizontally changed to satisfy these relations before and after embedding processing.

Information can be embedded by setting a difference unrecognizable (invisible) by the human eye between two character spacings in a text area formed from characters. When embedding information in this manner, the embeddable information amount depends on the number of characters. A recognition error in extracting information can be suppressed by embedding information in characters with regularity (e.g., every second character) or adding an error correcting code. The error correcting code can be, for example, a BCH code or Reed-Solomon code.

[Processing by Determination Unit 103]

When embedding information by setting a difference between two character spacings, before and after a character, as described above, the difference between character spacings before and after embedding information is given by $(P+S)\rho$. A value e is determined in consideration of a character spacing error. After printer and scanner processes, the character spacing may vary within the range of the value e. For this reason, the value e is determined considering the result of calculating the statistics of variations in character spacing using many samples. When the value e is defined in this way, a condition to determine that the character spacing is not sufficient is $(P+S)\rho<e$, that is, $(P+S)<e/\rho$. That is, a desired embedding strength $\rho$ and value e determine whether the character spacing is sufficient.

The determination unit 103 makes this determination for all combinations of character spacings used to embed information. The determination unit 103 outputs, as character width reduction portion information, information (character position) on a portion determined not to have a sufficient sum of character spacings. The character width reduction portion information is information on the positions of a plurality of characters, and includes the coordinates (row number and a number counted from the left) for each character.

[Processing by Reduction Unit 104]

The reduction amounts of a target character and preceding and succeeding characters, which are represented by character width reduction portion information, will be explained.

Letting P' and S' be character spacings after embedding information, a condition $P'+S'>e/\rho$ needs to be satisfied. Letting P and S be character spacings before embedding information, when increasing the sum of the character spacings P and S by d, $P+S+d>e/\rho$, that is, $d>e/\rho-(P+S)$ needs to be satisfied. The amount of reduction of each character to meet this condition and obtain a necessary character spacing depends on assignment of a necessary increase in character spacing to the reduction width of each character.

Figure 4:
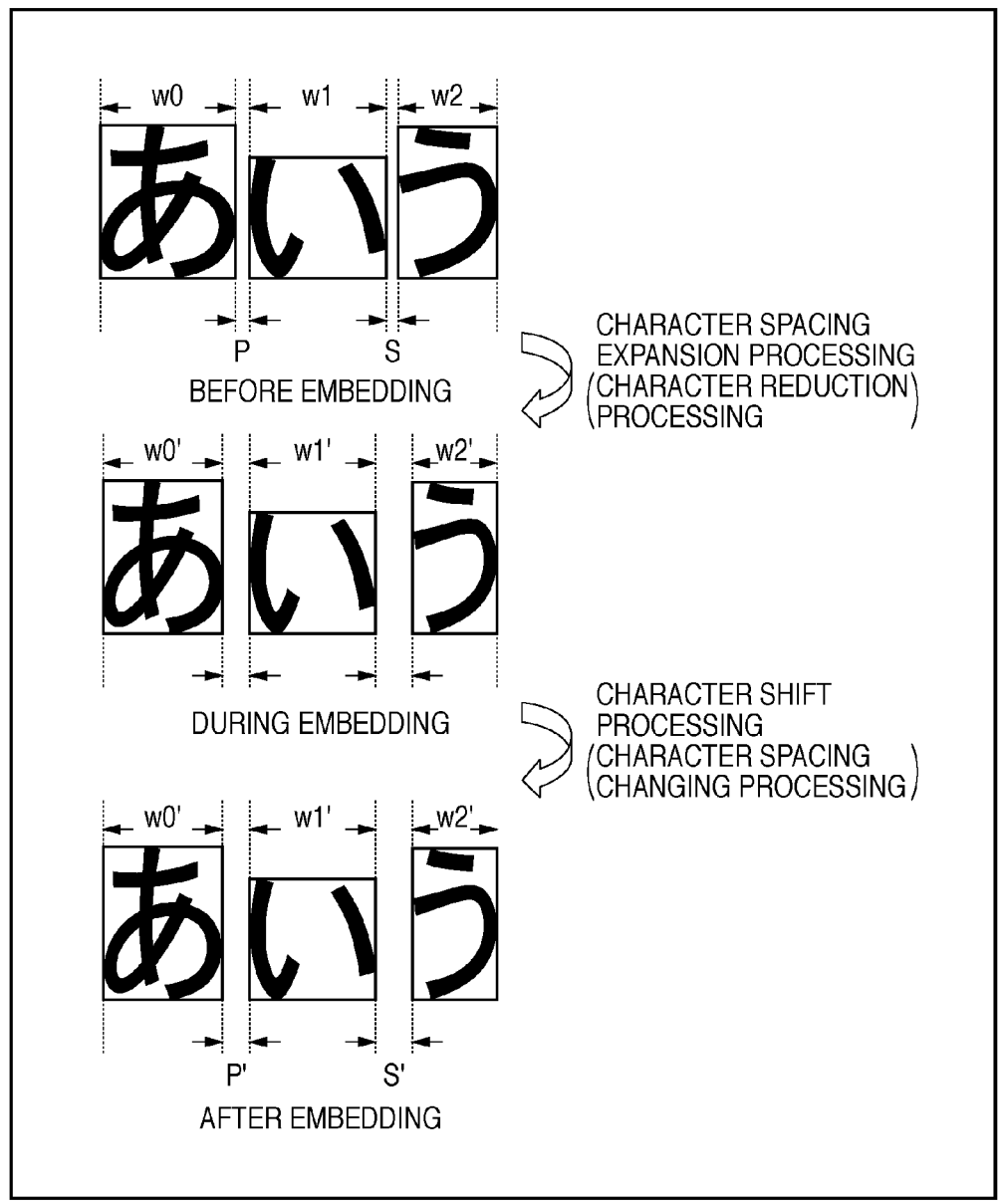
FIG. 4 is a view showing the processing procedures of a reduction unit 104 according to the first embodiment.

FIG. 4 is a view showing the processing procedures of the reduction unit 104 according to the first embodiment. A necessary increase in character spacing is assigned to a character whose position changes in embedding, and preceding and succeeding characters.

Let w0 be the character width of a preceding character "あ" adjacent to a character "い" whose position changes. Let w1 be the character width of the character "い" whose position changes. Let w2 be the character width of a succeeding character "う" adjacent to the character "い" whose position changes. Let w0', w1', and w2' be character widths after reduction, respectively. In this case, the character widths are reduced to satisfy the following equations.

Assignment of the character spacing increase d to the respective characters when increasing the character spacing by d will be exemplified. For example, a proper one of equations (1) to (4) is selected in accordance with the use status (e.g., the type of document image):

$$w0' = w0 - d/3,\ w1' = w1 - d/3,\ w2' = w2 - d/3 \quad (1)$$

$$w0' = w0 - dw0/(w0+w1+w2),$$
$$w1' = w1 - dw1/(w0+w1+w2),$$
$$w2' = w2 - dw2/(w0+w1+w2) \quad (2)$$

$$w0' = w0 - d/2,\ w1' = w1 - d/2,\ w2' = w2 \quad (3)$$

$$w0' = w0 - dw0/(w0+w1),$$
$$w1' = w1 - dw1/(w0+w1),\ w2' = w2 \quad (4)$$

Equation (1) assigns the reduction width to make the reduction widths of the three characters equal to each other (i.e., d/3 for each character). Equation (2) assigns the reduction width to the three characters in accordance with the ratios of the character widths w0, w1, and w2 to the sum (w0+w1+w2) of the three adjacent character widths. Equation (3) assigns the reduction width to make the reduction widths of two adjacent characters equal to each other (i.e., d/2 for each character). Equation (4) assigns the reduction width to two characters in accordance with the ratios of the character widths w0 and w1 to the sum (w0+w1) of the two adjacent character widths.

In FIG. 3, a rectangular area a is changed so that its left end coincides with that of an original rectangular area. A rectangular area c is changed so that its right end coincides with that of an original rectangular area. As for a rectangular area b, the change width of the character position in embedding information can be arbitrarily set. This is because the sum of the spacings between character "b" and preceding and succeeding characters suffices to meet the above-described condition, and the values of character spacings after changing the character position suffices to finally have a proper difference in order to represent information.

[Operation Procedures of Information Embedding Apparatus 100]

Figure 5:
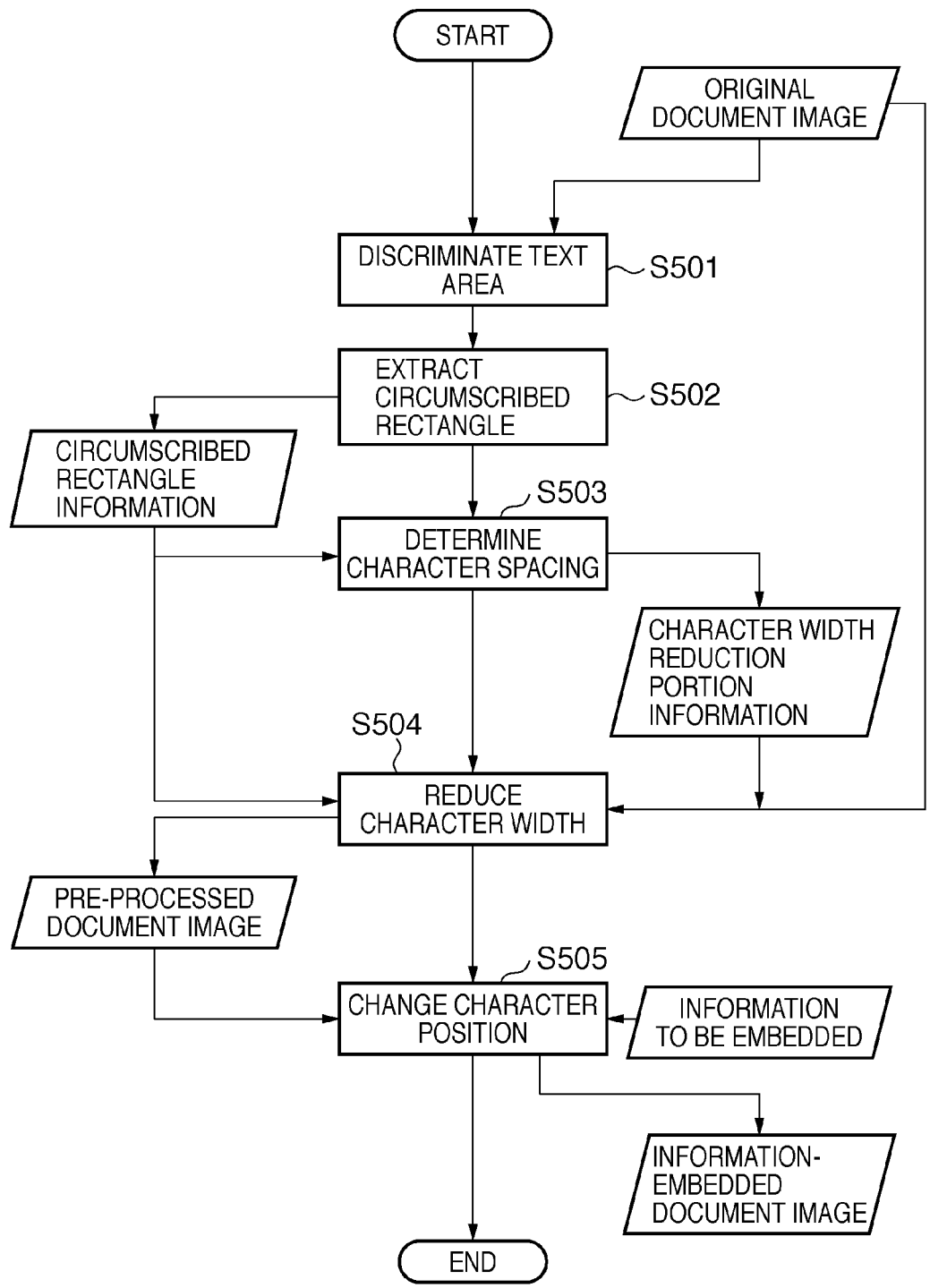
FIG. 5 is a flowchart showing the operation procedures of the information embedding apparatus 100 according to the first embodiment.

FIG. 5 is a flowchart showing the operation procedures of the information embedding apparatus 100 according to the first embodiment. The discrimination unit 101 discriminates a text area in an original document image (step S501). The circumscribed rectangle extraction unit 102 extracts the circumscribed rectangle of each character (step S502). The RAM or the like stores the extraction result as information (circumscribed rectangle information) on the position and size of the circumscribed rectangle. Based on the stored circumscribed rectangle information, the determination unit 103 determines whether there is a portion having a character spacing smaller than a threshold (step S503). The RAM or the like stores information (character width reduction portion information) which represents the determination result and represents a portion at which the character width is to be reduced.

Based on the original document image, character width reduction portion information, and circumscribed rectangle information, the reduction unit 104 reduces, in the character arrangement direction, the size of a character determined to have a character spacing smaller than the threshold, so as to set the character spacing equal to or larger than the threshold (step S504). As a result, a document image (pre-processed document image) in which the size of the character in the character arrangement direction is reduced is generated. Finally, the character position changing unit 105 changes the character position based on the pre-processed document image and information to be embedded (step S505).

As described above, according to the first embodiment, the character width is reduced in advance to ensure an information embedding space before changing the character position, and then information is embedded. Even in a document image in which a proportional font, single-byte character, and the like for which the character spacing is originally narrow coexist, information can be embedded similarly to a normal double-byte character or the like. Information can be embedded in a document image so as to be able to more accurately extract embedded information.

Since the first embodiment assumes a case (horizontal writing) where characters are arrayed horizontally, the reduction unit 104 reduces the horizontal size of a character. When characters are arrayed vertically (vertical writing), the vertical size of a character may also be reduced.

In the first embodiment, the size of a character is reduced in only the character arrangement direction (horizontal direction). However, it suffices to reduce the size of a character in at least the character arrangement direction, so the size of a character in a direction (vertical direction) perpendicular to the character arrangement direction may also be reduced.

[Modification to First Embodiment]

The first embodiment assumes that a document image is bitmapped. In the modification, a document image is expressed in a page description language (to be also referred to as a PDL hereinafter).

Figure 2:
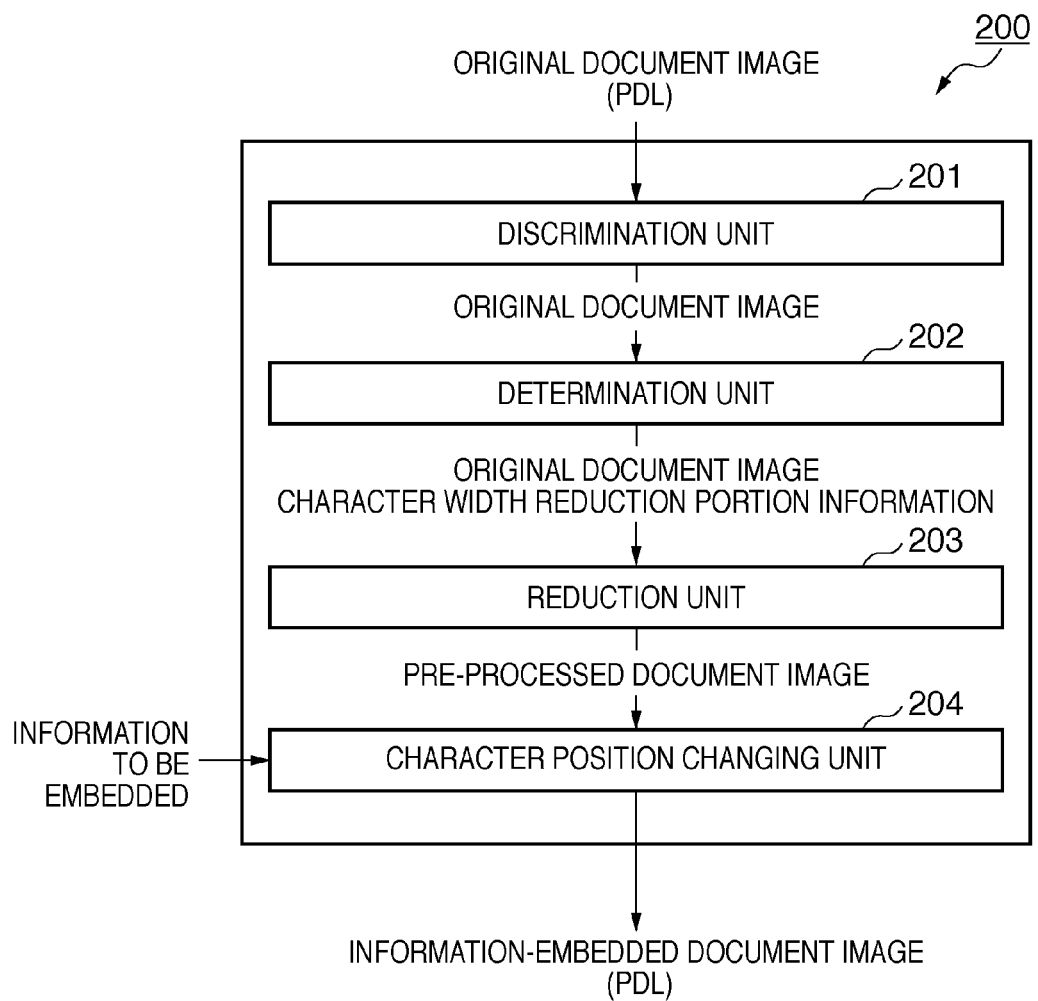
FIG. 2 is a block diagram showing the functional arrangement of an information embedding apparatus 200 according to a modification to the first embodiment.

FIG. 2 is a block diagram showing the functional arrangement of an information embedding apparatus 200 according to the modification to the first embodiment. The information embedding apparatus 200 comprises a discrimination unit 201, determination unit 202, reduction unit 203, and character position changing unit 204.

The discrimination unit 201 discriminates a text area in an original document image expressed in the PDL.

The determination unit 202 determines, based on the position and size of each extracted circumscribed rectangle, whether there is a portion having a character spacing smaller than a threshold. If the character spacing is not sufficient, the determination unit 202 outputs information on the position as character width reduction portion information.

For a character determined by the determination unit 202 to have a character spacing smaller than the threshold, the reduction unit 203 reduces the size of the character in at least the character arrangement direction so as to set the character spacing equal to or larger than the threshold. In order to increase the character spacing by a shortage, the reduction unit 203 reduces the character width of another portion based on the original document image and character width reduction portion information, obtaining a pre-processed document image.

In accordance with information to be embedded, the character position changing unit 204 changes, in the horizontal direction, the positions of characters determined by the determination unit 202 to have a character spacing equal to or larger than the threshold, and those of characters reduced by the reduction unit 203, obtaining a document image in which information expressed in the PDL is embedded. In this modification, the processes by the reduction unit 203 and character position changing unit 204 are to change the PDL.

Figure 13:
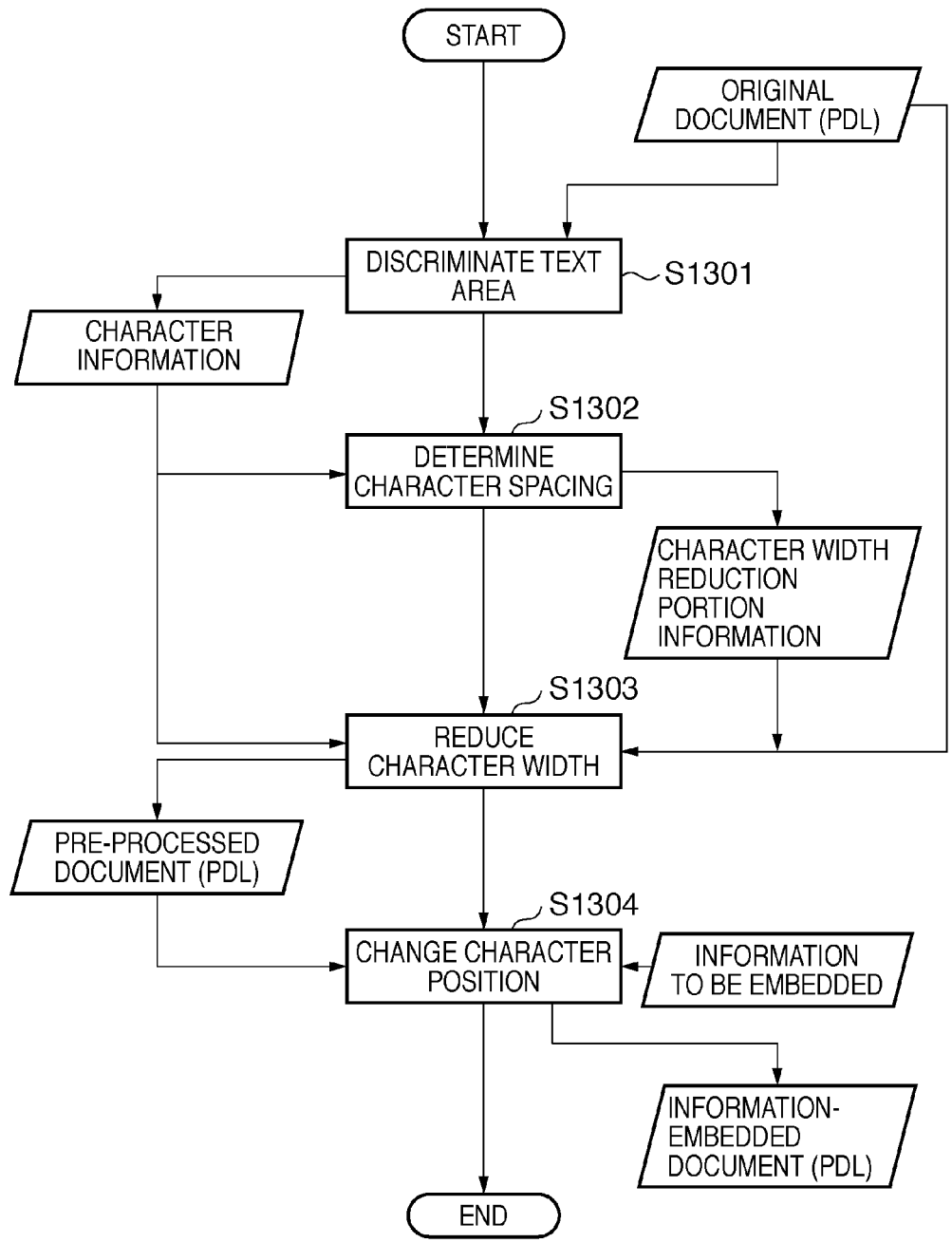
FIG. 13 is a flowchart showing the operation procedures of the information embedding apparatus 200 according to the modification to the first embodiment.

FIG. 13 is a flowchart showing the operation procedures of the information embedding apparatus 200 according to the modification to the first embodiment. A text area in an original document image expressed in the PDL is discriminated (step S1301). The RAM or the like stores information (character information) including information on the size and position of each character and the like. It is determined based on the position and size of each extracted circumscribed rectangle whether there is a portion having a character spacing smaller than a threshold (step S1302). More specifically, whether the character spacing is larger than the threshold is determined for all portions used to embed information, in consideration of the above-mentioned information embedding method, and printing and scanning errors, so as to be able to reliably extract embedded information. Then, the RAM or the like stores, as character width reduction portion information, information on a portion determined to have a character spacing equal to or smaller than the threshold.

The character width in the original document expressed in the PDL is reduced based on the character information and character width reduction portion information (step S1303). Finally, the character position is changed based on information to be embedded and the pre-processed document (PDL) (step S1304), outputting a document which is expressed in the PDL and contains information.

The modification can embed information by changing the PDL.

Second Embodiment

The above-described first embodiment does not assume a case where portions at which the character spacing is not sufficiently ensured continue. To the contrary, the second embodiment assumes a case where portions at which the character spacing is not sufficiently ensured continue.

Figure 6:
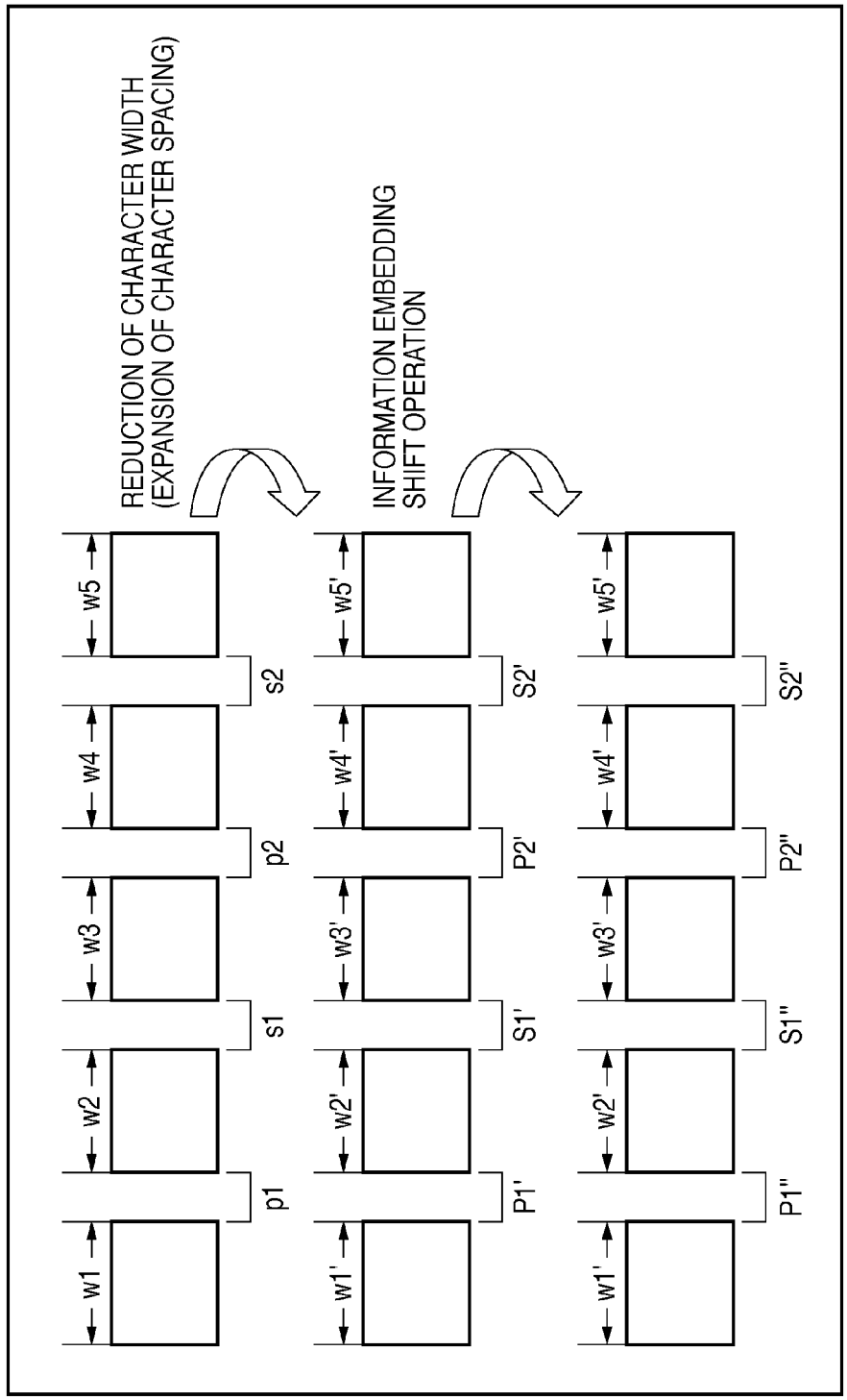
FIG. 6 is a view showing the processing procedures of an information embedding apparatus according to the second embodiment.

FIG. 6 is a view showing the processing procedures of an information embedding apparatus according to the second embodiment. Let w1, w2, w3, w4, and w5 be character widths before reducing the character width, respectively. Let w1', w2', w3', w4', and w5' be character widths after reducing the character width, respectively. In this case, w1' to w5' can be given using w1 to w5:

$$w1'=w1-(d1+d2)w1/(w1+w2+w3+w4+w5)$$

$$w2'=w2-(d1+d2)w2/(w1+w2+w3+w4+w5)$$

$$w3'=w3-(d1+d2)w3/(w1+w2+w3+w4+w5)$$

$$w4'=w4-(d1+d2)w4/(w1+w2+w3+w4+w5)$$

$$w5'=w5-(d1+d2)w5/(w1+w2+w3+w4+w5)$$

The relations before and after reducing the character width which are represented by these equations are similar to equation (2) described in the first embodiment. However, the above-described equation (2) assigns the reduction width to all three characters adjacent to two character spacings (see FIG. 3). Even a character whose position does not change in embedding is reduced. In this case, reduction processing is sometimes done twice for one character. For example, even when reducing the character widths of three adjacent characters "あ", "い", and "う" shown in FIG. 4, the character widths of the character "う" at the right end and two characters succeeding to the character "う" are reduced. Hence, the character "う" undergoes reduction processing twice.

In contrast, according to the second embodiment, reduction processing suffices to be done only once, and the reduction width is distributed to successive characters. Even when six or more characters continue, the reduction width can be similarly calculated. The reduction width can also be calculated for an entire row or column at once.

The second embodiment can reduce visual unnaturalness of an information-embedded document image.

In the second embodiment, the reduction unit distributes the shortage of the character width to characters within a predetermined range in accordance with the ratios of character spacings to the sum of the character widths of characters within the predetermined range. However, the reduction unit may also weight the reduction width so as to make a character smaller as the character is closer to the end of a predetermined range, and larger as it is closer to the center. The predetermined range can be defined for each row, column, or word. It is also possible to determine a weighting coefficient based on a known technique such as the Hamming window, Hanning window, or triangular window, and set a weighting coefficient to be 1 as a result of summation.

Third Embodiment

The above-described second embodiment needs to execute calculation for the decimal part in order to distribute the shortage of the character width in accordance with the character width of each character. To the contrary, the third embodiment can distribute the shortage of the character width by calculation for only the integral part.

Figure 7:
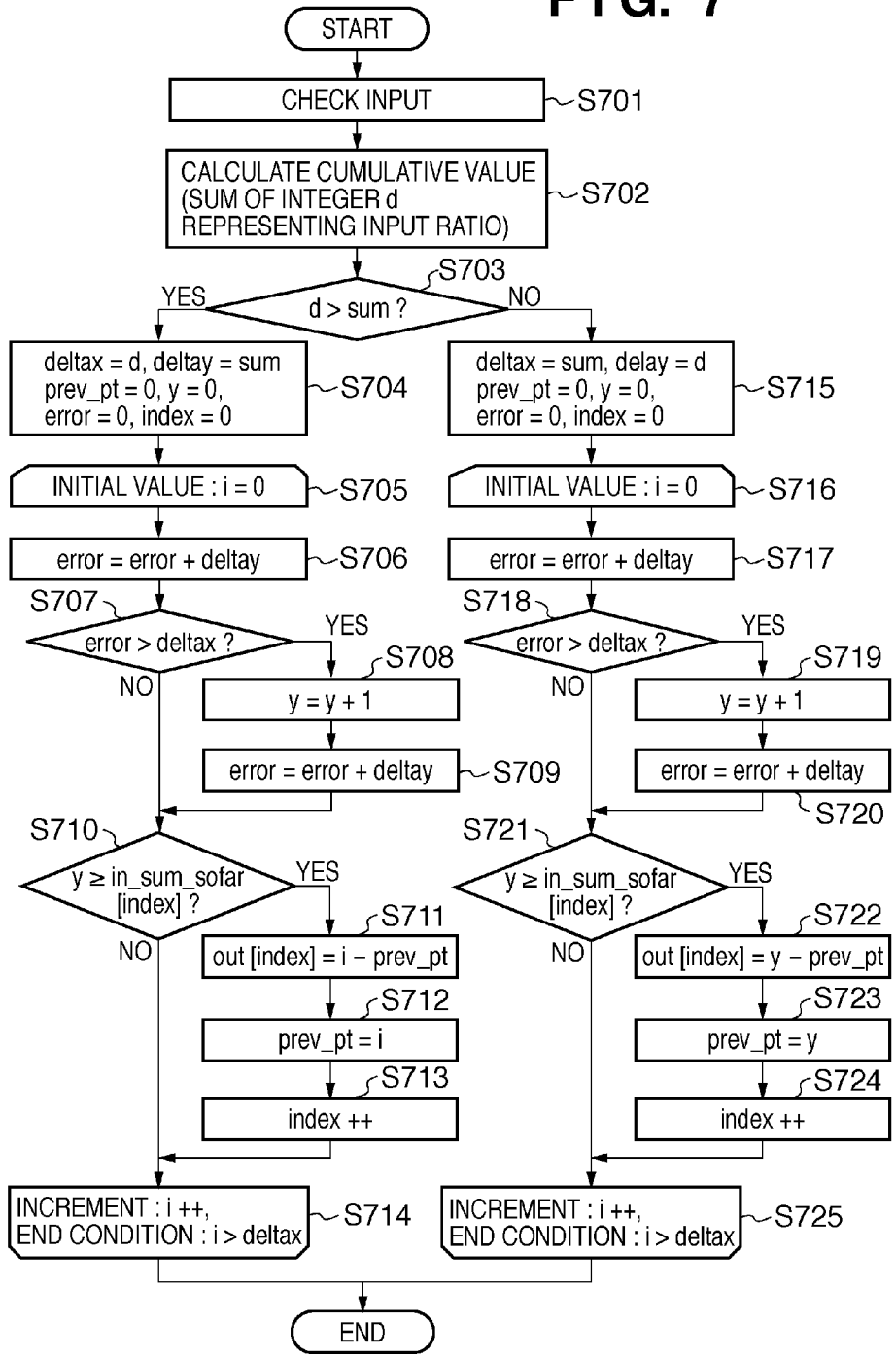
FIG. 7 is a flowchart showing the operation procedures of an information embedding apparatus according to the third embodiment.

FIG. 7 is a flowchart showing the operation procedures of an information embedding apparatus according to the third embodiment. In this case, proportional allocation is calculated using only integral values, similar to a known Bresenham line drawing algorithm.

Input of a ratio d represented by an integer is checked (step S701), and a cumulative value sum of the ratio d is calculated (step S702). It is determined whether the ratio d is higher than the cumulative value sum (step S703). If it is determined in step S703 that the input ratio is higher than the cumulative value (d>sum), the process advances to step S704. If it is determined that the input ratio is equal to or lower than the cumulative value (d≦sum), the process advances to step S715.

The value of each variable is initialized (step S704), and an initial value of 0 is substituted into a loop counter i (step S705). Steps S706 to S713 are processes within the loop deltay is added to error (step S706). It is determined whether error is larger than deltax (error>deltax) (step 8707). If it is determined in step S707 that error is equal to or smaller than deltax (error≦deltax), the process advances to step S710. If it is determined in step S707 that error is larger than deltax (error>deltax), y is incremented (step 8708), and deltay is added to error (step S709).

It is determined whether y is equal to or larger than in_sum_sofar [index] (step S710). If it is determined that y is smaller than in_sum_sofar [index], the process advances to step S714. If it is determined that y is equal to or larger than in_sum_sofar [index], the process advances to step S711 to substitute i-prev_pt into out [index]. Then, i is substituted into prev_pt (step S712), and index is incremented (step S713). Step S714 represents the end of the loop. The increment is i++, and the end condition is i>deltax.

If it is determined in step S703 that the ratio d is equal to or lower than the cumulative value sum (d≦sum), the value of each variable is initialized (step 3715), and an initial value of 0 is substituted into the loop counter i (step S716). Steps S717 to S724 are processes within the loop deltay is added to error (step 3717). It is determined whether error is larger than deltax (error>deltax) (step S718). If it is determined in step S718 that error is larger than deltax (error>deltax), the process advances to step 3719.

Then, y is incremented (step S719), and deltay is added to error (step S720). It is determined whether I is equal to or larger than in_sum_sofar [index] (step S721). If it is determined that I is equal to or larger than in_sum_sofar [index], the process advances to step S722. y-prev_pt is substituted into out [index] (step S722), y is substituted into prev_pt (step S723), and index is incremented (step S724). Step S725 represents the end of the loop. The increment is i++, and the end condition is i>deltax.

The third embodiment does not require floating-point arithmetic because proportional allocation is calculated by only integer arithmetic using the Bresenham line drawing algorithm. Calculation for embedding information can be executed at high speed with a low-cost computer resource.

Fourth Embodiment

In the above-described first to third embodiments, a character is reduced by the nearest neighbor method, linear interpolation, or the like. However, when these methods are simply applied to only the horizontal direction of a document image, the line width (thickness) of a character becomes different between the vertical and horizontal directions, resulting in an unnatural appearance. To solve this, in the fourth embodiment, the reduction unit adds pixels to a character in the horizontal direction to make the horizontal line width of the character equal to the vertical one after reducing the character in the character arrangement direction. That is, the reduction unit reduces a character in only the horizontal direction, and adds pixels in the horizontal direction in order to keep the line width of the character constant between the vertical and horizontal directions.

When the line width of a character is recognized in advance, the number of horizontal pixels corresponding to a decrease in line width upon reducing the character is calculated. Black pixels are added to the boundary between black and white pixels so as to thicken the character by the decrease in the horizontal direction.

When the line width of a character is not recognized in advance, it may also be automatically obtained according to a technique disclosed in, for example, Japanese Patent Publication No. 59-42906 or 61-2237. The fourth embodiment can easily, reliably suppress deformation of a character upon reducing the character width.

Fifth Embodiment

In the above-described first to fourth embodiments, deformation of a character upon reducing the character width is suppressed, so the character spacing which can be ensured by reducing the character width is limited. To the contrary, in the fifth embodiment, it is checked whether another character spacing has an allowance. If so, the positions of all characters belonging to the row are changed to allocate the allowance to an insufficient character spacing, thereby ensuring a character spacing necessary to embed information. According to the fifth embodiment, the character width is reduced only when the character spacing is still insufficient even upon adding the allowance.

Figure 9:
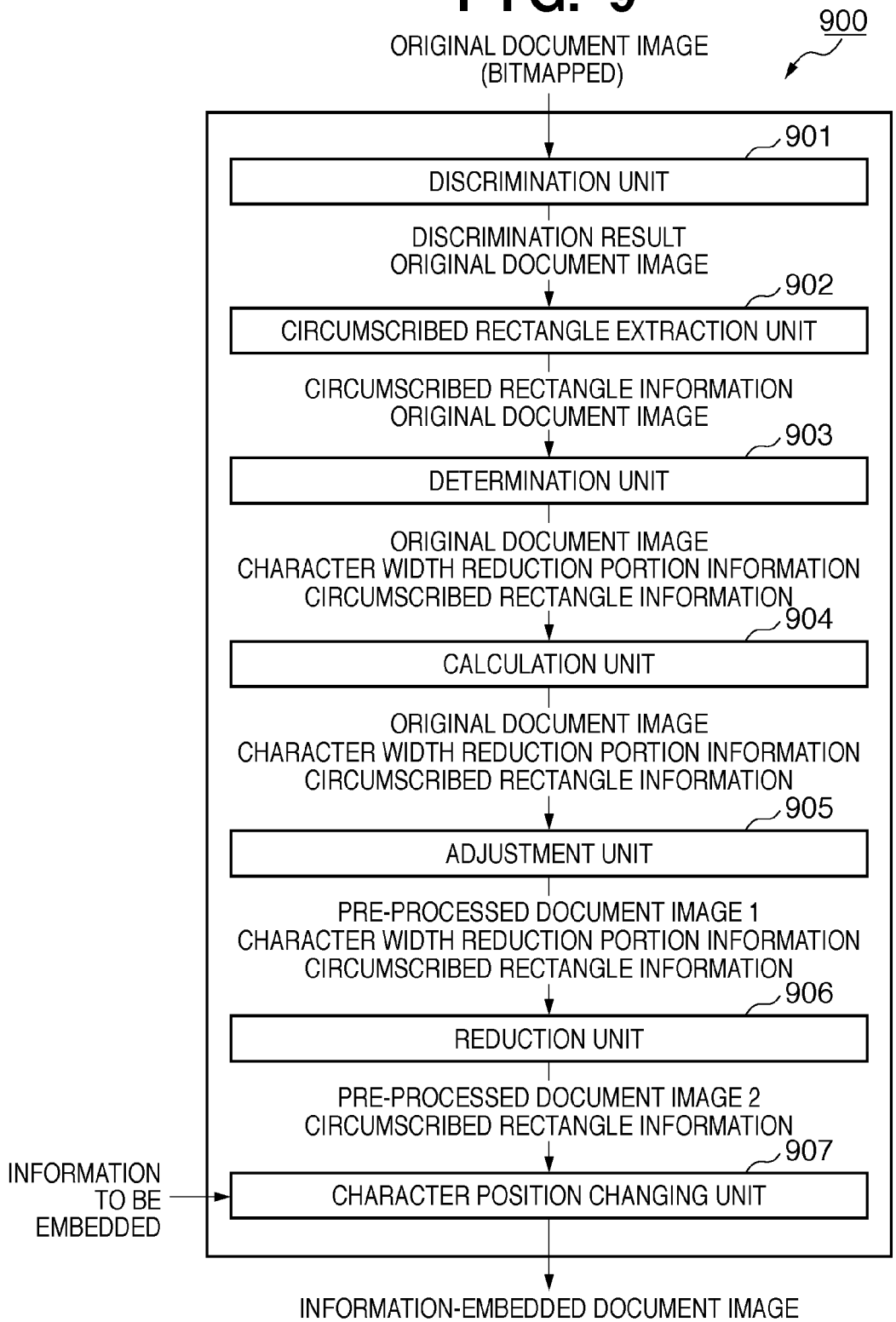
FIG. 9 is a block diagram showing the functional arrangement of an information embedding apparatus 900 according to the fifth embodiment.

FIG. 9 is a block diagram showing the functional arrangement of an information embedding apparatus 900 according to the fifth embodiment. The information embedding apparatus 900 comprises a discrimination unit 901, circumscribed rectangle extraction unit 902, determination unit 903, calculation unit 904, adjustment unit 905, reduction unit 906, and character position changing unit 907.

The discrimination unit 901 discriminates a text area from the areas of a text, figure, photograph, and the like in an original document image. Assume that the original document image is a binary image in which the value of each pixel represents white or black.

The circumscribed rectangle extraction unit 902 extracts the circumscribed rectangle of each character in the text area discriminated by the discrimination unit 901, obtaining information (circumscribed rectangle information) on the position and size of each extracted circumscribed rectangle. This processing is to first extract a row using a horizontal projection and then extract a character using a vertical projection for each extracted row.

The determination unit 903 determines, based on the circumscribed rectangle information, whether there is a portion having a character spacing smaller than a threshold. More specifically, whether the character spacing is sufficient to properly embed information is determined in consideration of the method of embedding information by changing the character spacing (to be described later), and printing and scanning characteristics.

The calculation unit 904 calculates the shortage of the character spacing for each row in consideration of the information embedding method. Note that information is embedded similarly to the first embodiment.

When characters determined by the determination unit 903 to have a character spacing smaller than the threshold exist on a single row or column, the adjustment unit 905 searches other characters on the row or column for a portion determined to have a character spacing equal to or larger than the threshold. When a portion having a character spacing equal to or larger than the threshold is detected, the adjustment unit 905 adjusts the character spacing so that the character spacing determined to be smaller than the threshold becomes equal to or larger than the threshold. More specifically, the adjustment unit 905 adjusts the positions of all characters belonging to each row at once based on the result of calculating the shortage of a character spacing, so as to allocate the allowance of the character spacing to an insufficient spacing.

Only when characters determined by the determination unit 903 to have a character spacing equal to or larger than the threshold do not exist on a single row or column, or only when the adjustment unit 905 cannot compensate for the shortage of the character width, the reduction unit 906 reduces the size of a character in the character arrangement direction. More specifically, the reduction unit 906 reduces the character width at a portion determined not to be able to properly embed target information, generating a pre-processed document image. A character is reduced in only the horizontal direction using one of the nearest neighbor method, linear interpolation, and bicubic method.

The character position changing unit 907 changes, in the horizontal direction, the positions of characters having a character spacing equal to or larger than the threshold, and those of characters reduced by the reduction unit 906 in the pre-processed document image, generating an information-embedded document image.

Figure 10:
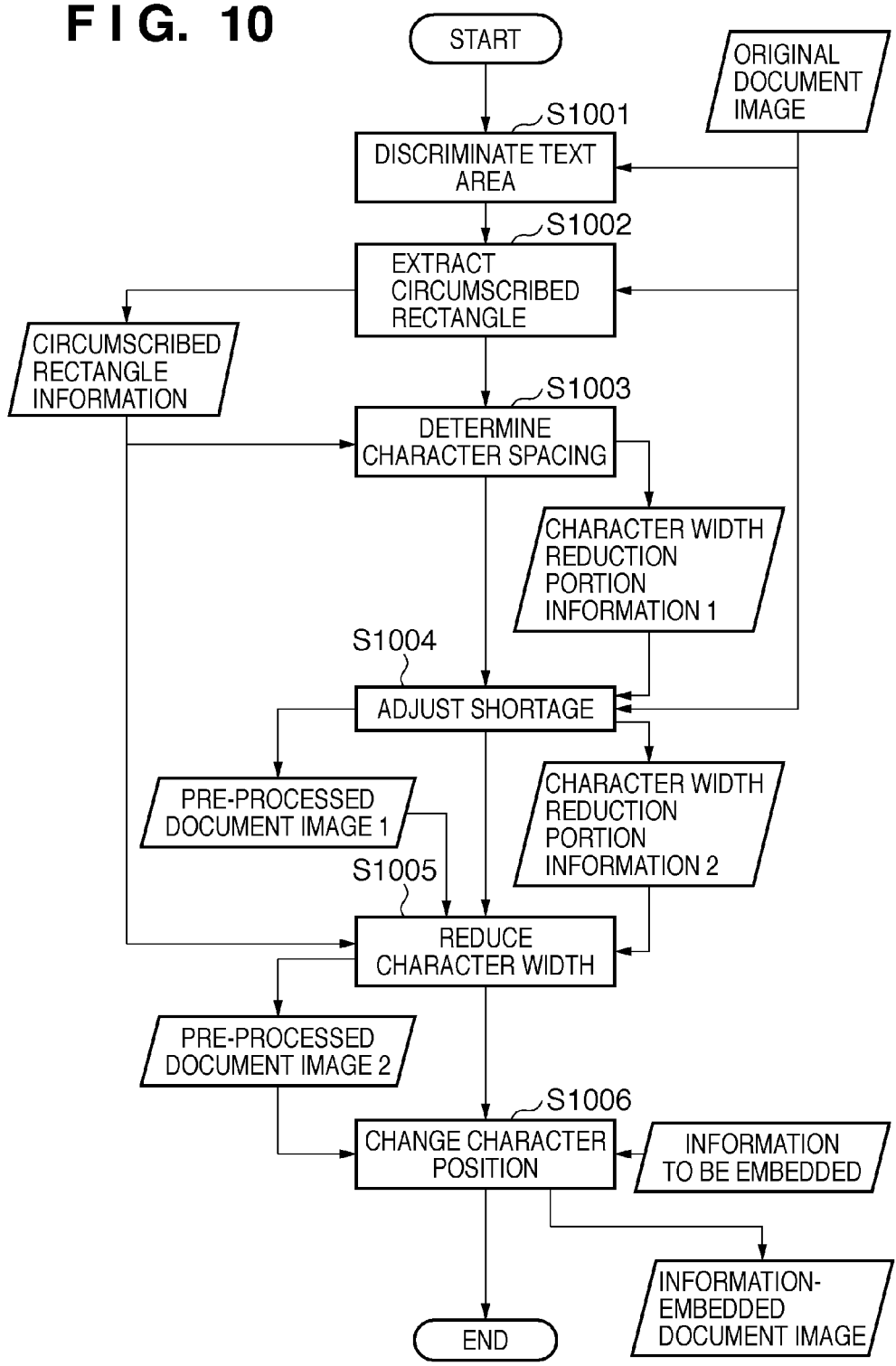
FIG. 10 is a flowchart showing the operation procedures of the information embedding apparatus 900 according to the fifth embodiment.

FIG. 10 is a flowchart showing the operation procedures of the information embedding apparatus 900. The discrimination unit 901 discriminates a text area from the areas of a text, figure, photograph, and the like in an original document image (step S1001). The circumscribed rectangle of each character is extracted from the text area discriminated in step S1001 (step S1002), obtaining circumscribed rectangle information. Based on the circumscribed rectangle information, the determination unit 903 determines whether there is a portion having a character spacing smaller than a threshold (step S1003), obtaining character width reduction portion information 1. At this time, the information embedding method described in the first embodiment, and printing and scanning errors are considered.

The adjustment unit 905 adjusts the shortage of the character spacing (step S1004). At a portion having a sufficient spacing, the positions of all characters belonging to the row are changed in the horizontal direction, allocating a necessary spacing to a portion suffering an insufficient spacing. In this way, pre-processed document image 1 and character width reduction portion information 2 are output. Character width reduction portion information 2 is obtained by removing, from character width reduction portion information 1, a portion at which the character width need not be reduced upon adjusting the shortage of the character spacing.

The character width in pre-pressed document image 1 is reduced based on character width reduction portion information 2 (step S1005), obtaining pre-processed document image 2. The character position in pre-processed document image 2 is changed based on information to be embedded (step S1006), outputting an information-embedded document image.

The fifth embodiment can decrease portions at which the character width is to be reduced, more reliably reducing unnatural deformation of a character.

Sixth Embodiment

In the above-described fifth embodiment, when the determination unit determines that the character spacing is insufficient, and the character spacing at another portion on the row has an allowance, the allowance is allocated to the portion suffering an insufficient character spacing. In contrast, in the sixth embodiment, when the determination unit determines that the character spacing is insufficient, and there are margins between the right and left ends of the row and the ends of output paper, the row is extended to the margins.

Figure 11:
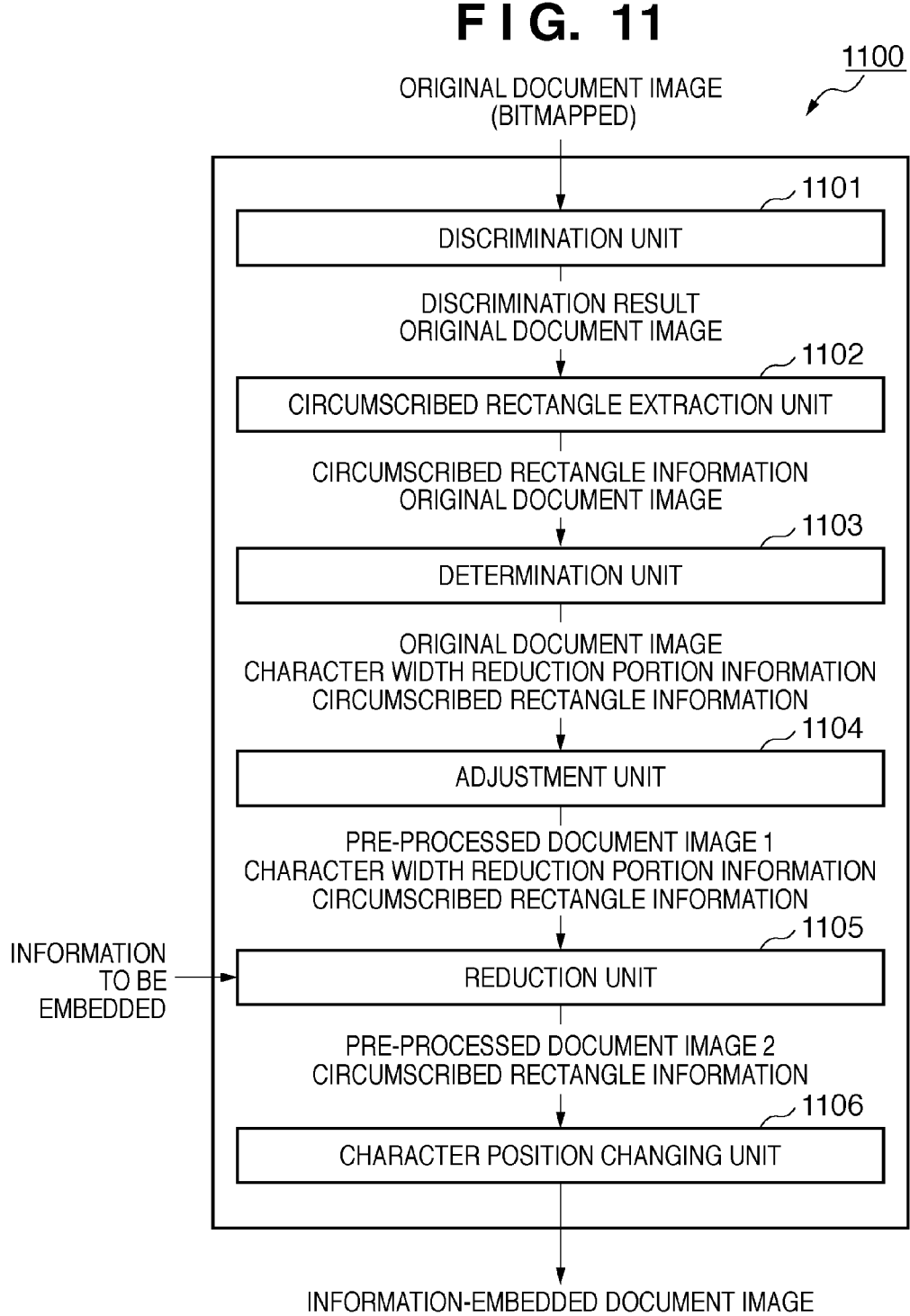
FIG. 11 is a block diagram showing the functional arrangement of an information embedding apparatus 1100 according to the sixth embodiment.

FIG. 11 is a block diagram showing the functional arrangement of an information embedding apparatus 1100 according to the sixth embodiment. The information embedding apparatus 1100 comprises a discrimination unit 1101, circumscribed rectangle extraction unit 1102, determination unit 1103, adjustment unit 1104, reduction unit 1105, and character position changing unit 1106.

The discrimination unit 1101 discriminates a text area from the areas of a text, figure, photograph, and the like in an original document image. Assume that the original document image is a binary image in which the value of each pixel represents white or black.

The circumscribed rectangle extraction unit 1102 extracts the circumscribed rectangle of each character in the text area discriminated by the discrimination unit 1101. This processing is to first extract a row using a horizontal projection and then extract a character using a vertical projection for each extracted row.

The determination unit 1103 determines, based on the position and size of each extracted circumscribed rectangle, whether there is a portion having a character spacing smaller than a threshold. When the determination unit 1103 determines that the character spacing is smaller than the threshold, it further determines whether the distance between the end of the row or column and that of output paper is larger than a threshold. More specifically, whether the character spacing is sufficient to properly embed information is determined based on the circumscribed rectangle extraction result in consideration of the method of embedding information by changing the character spacing, and printing and scanning characteristics.

When the determination unit 1103 determines that the distance between the end of the row or column and that of output paper is larger than the threshold, the adjustment unit 1104 extends the text area of the row or column in the horizontal direction to adjust the character spacing to become equal to or larger than the threshold. More specifically, if the appearance of the document is not impaired even upon extending, to right and left margins, a row including a character determined by the determination unit 1103 to have an insufficient character spacing, the adjustment unit 1104 changes the positions of characters belonging to the row in the horizontal direction. Accordingly, the width of the row is increased to compensate for the shortage of the character spacing.

Only when the distance between the end of the row or column and that of output paper is equal to or smaller than the threshold, the reduction unit 1105 reduces the size of a character in the character arrangement direction. More specifically, the reduction unit 1105 reduces the character width at a portion determined not to be able to properly embed information, generating a pre-processed document image. A character is reduced in only the horizontal direction using one of the nearest neighbor method, linear interpolation, and bicubic method.

The character position changing unit 1106 changes the positions of characters in the horizontal direction in the pre-processed document image in accordance with information to be embedded, generating an information-embedded document image.

Figure 12:
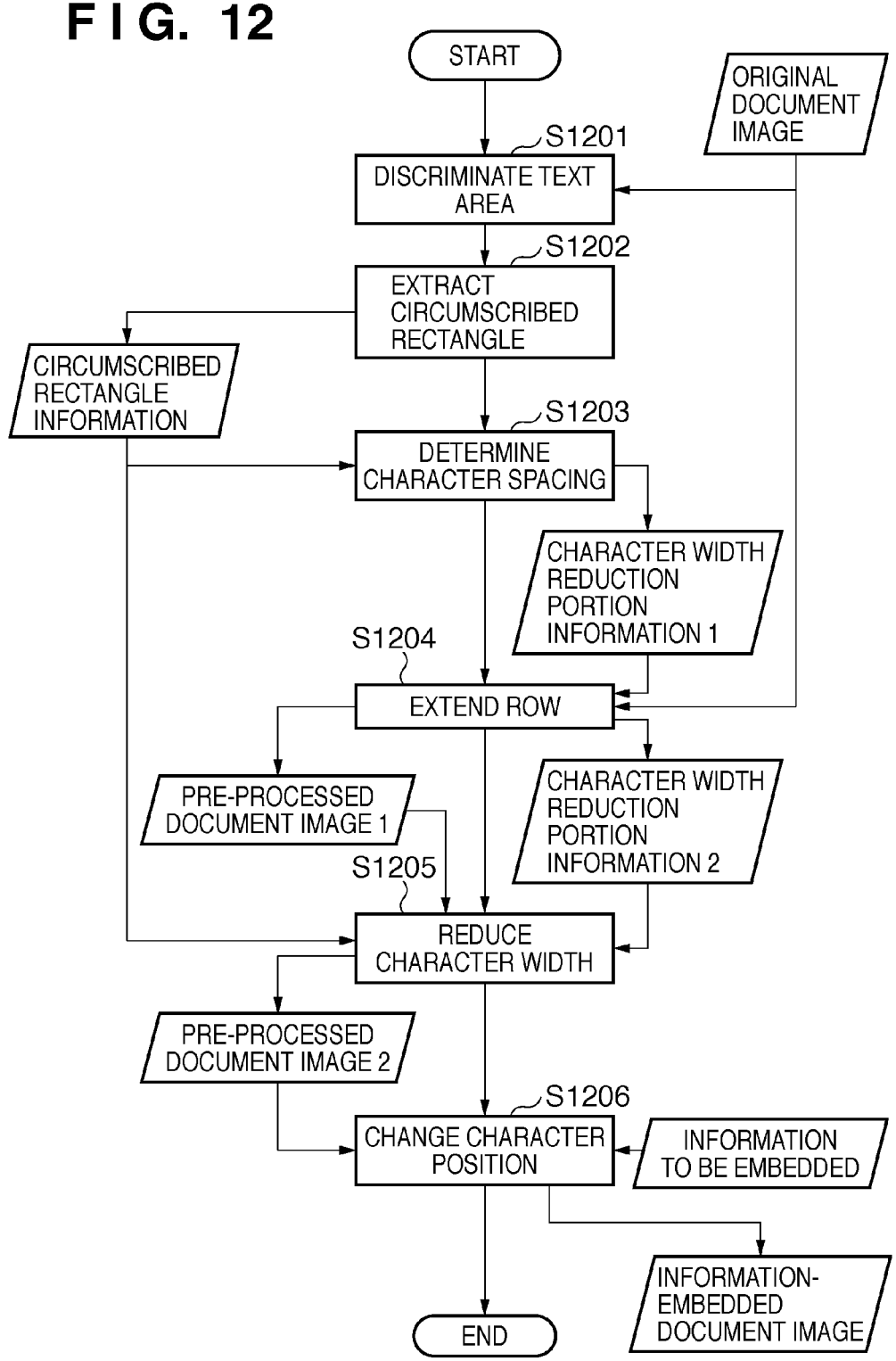
FIG. 12 is a flowchart showing the operation procedures of the information embedding apparatus 1100 according to the sixth embodiment.

FIG. 12 is a flowchart showing the operation procedures of the information embedding apparatus 1100 according to the sixth embodiment.

The discrimination unit 1101 discriminates a text area from the areas of a text, figure, photograph, and the like in an original document image (step S1201). The circumscribed rectangle of each character in the text area discriminated by the discrimination unit 1101 is extracted, outputting circumscribed rectangle information (step S1202). Based on the position and size of each extracted circumscribed rectangle, the determination unit 1103 determines whether there is a portion having a character spacing smaller than a threshold (step S1203), outputting character width reduction portion information 1.

If margins on the right and left sides of the row are so sufficient as to keep the appearance of the document, the adjustment unit 1104 increases the width of the row by changing the positions of characters belonging to the row (step S1204), generating pre-processed document image 1. Character width reduction portion information 2 is obtained by removing, from character width reduction portion information 1, a portion at which the character width need not be reduced upon this processing.

The reduction unit 1105 reduces the character width in pre-pressed document image 1 based on character width reduction portion information 2 (step S1205). Finally, the character position changing unit 1106 changes the character position in pre-processed document image 2 based on information to be embedded (step S1206), outputting an information-embedded document image.

The sixth embodiment can reduce the character width, more reliably suppressing unnatural deformation of a character.

Other Embodiments

The embodiments may also be applied to a system including a plurality of devices (e.g., a host computer, interface device, reader, and printer), or an apparatus (e.g., a copying machine, multi-function peripheral, or facsimile apparatus) formed by a single device.

The present invention may also be applied by supplying a computer-readable storage medium (or recording medium) which stores the computer program codes of software for implementing the functions of the above-described embodiments to a system or apparatus. The present invention may also be applied by reading out and executing the program codes stored in the recording medium by the computer (or the CPU or MPU) of the system or apparatus. In this case, the program codes read out from the recording medium implement the functions of the above-described embodiments, and the recording medium which records the program codes constitutes the embodiments. Also, the present invention includes a case where an OS (Operating System) or the like running on the computer performs some or all of actual processes based on the instructions of the program codes and thereby implements the functions of the above-described embodiments.

The present invention also includes a case where the program codes read out from the recording medium are written in the memory of a function expansion card inserted into the computer or the memory of a function expansion unit connected to the computer, and the CPU of the function expansion card or function expansion unit performs some or all of actual processes based on the instructions of the program codes and thereby implements the functions of the above-described embodiments.

When the embodiments are applied to the computer-readable storage medium, the storage medium stores computer program codes corresponding to the above-described flowcharts and functional arrangements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-269532, filed Oct. 16, 2007, which is hereby incorporated by reference herein in its entirety.

What is claimed is:

1. An image processing apparatus which embeds information by changing a character spacing in a document image, the apparatus comprising:
   discrimination means for discriminating a text area in the document image;
   circumscribed rectangle extraction means for extracting a circumscribed rectangle of each character in the text area discriminated by said discrimination means;
   determination means for determining, based on a position and size of each extracted circumscribed rectangle, whether a portion having a character spacing smaller than a threshold exists;
   reduction means for, in a portion determined by said determination means to have a character spacing smaller than the threshold, reducing a size of a character in at least a character arrangement direction so as to set the character spacing to be not smaller than the threshold; and
   character position changing means for changing, in accordance with information to be embedded, a position of a character in a portion determined by said determination means not to have a character spacing smaller than the threshold, and a position of a character reduced by said reduction means.

2. The apparatus according to claim 1, wherein the document image is bitmapped.

3. The apparatus according to claim 1, wherein
   the document image is expressed in a page description language, and
   said reduction means and said character position changing means change the page description language.

4. The apparatus according to claim 1, wherein said reduction means distributes a shortage of a character width to characters within a predetermined range in accordance with ratios of character spacings to a sum of character widths of characters within the predetermined range.

5. The apparatus according to claim 4, wherein the predetermined range includes a range defined for each row, column, or word.

6. The apparatus according to claim 5, wherein said reduction means weights a reduction width used by said reduction means so as to make a character width smaller as a character is closer to an end of the range.

7. The apparatus according to claim 4, wherein after reducing the character in the character arrangement direction, said reduction means adds a pixel in the character arrangement direction so as to make a line width in the arrangement direction equal to a line width in a direction perpendicular to the character arrangement direction.

8. The apparatus according to claim 4, wherein said reduction means performs calculation using only an integer when distributing the shortage of the character width.

9. The apparatus according to claim 1, further comprising adjustment means for, when a portion determined by said determination means to have a character spacing smaller than the threshold exists in a single row or column, searching other characters in the row or column for a portion determined to have a character spacing not smaller than the threshold, and when a portion having a character spacing not smaller than the threshold is detected, adjusting the character spacing so as to make the character spacing determined to be smaller than the threshold become not smaller than the threshold, wherein only when a portion determined by said determination means to have a character spacing not smaller than the threshold does not exist in the row or column, or only when said adjustment means cannot compensate for the shortage of the character width, said reduction means reduces the size in the character arrangement direction.

10. The apparatus according to claim 1, wherein when said determination means determines that a portion exists in which the character spacing is smaller than the threshold, said determination means further determines whether a distance between an end of a row or column and an end of an output paper is larger than the threshold, the image processing apparatus further comprises adjustment means for, when said determination means determines that the distance between the end of the row or column containing the portion and the end of the output paper is larger than the threshold, extending the text area of the row or column in a horizontal direction to adjust the character spacing to become not smaller than the threshold, and only when the distance between the end of the row or column and the end of the output paper is not larger than the threshold, said reduction means reduces the size in the character arrangement direction.

11. A non-transitory computer-readable storage medium storing a computer program which is read and executed by a computer to cause the computer to function as an image processing apparatus defined in claim 1.

* * * * *